(12) United States Patent
Kim

(10) Patent No.: US 10,752,163 B2
(45) Date of Patent: Aug. 25, 2020

(54) HEADLAMP CONTROL APPARATUS AND METHOD FOR PREVENTING LIGHT POLLUTION CAUSED BY SPEED BREAKER

(71) Applicant: MANDO CORPORATION, Pyeongtaek-si, Gyeonggi-do (KR)

(72) Inventor: Hyun Soo Kim, Seongnam-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 16/058,298

(22) Filed: Aug. 8, 2018

(65) Prior Publication Data
US 2019/0047465 A1    Feb. 14, 2019

(30) Foreign Application Priority Data
Aug. 8, 2017 (KR) .......................... 10-2017-0100094

(51) Int. Cl.
*B60Q 1/14* (2006.01)
*B60Q 1/115* (2006.01)
(Continued)

(52) U.S. Cl.
CPC ............ *B60Q 1/1407* (2013.01); *B60Q 1/115* (2013.01); *B60Q 2300/112* (2013.01);
(Continued)

(58) Field of Classification Search
CPC .... B60Q 2300/132; B60Q 1/10; B60Q 1/115; B60Q 2300/114; B60Q 2300/116;
(Continued)

(56) References Cited

U.S. PATENT DOCUMENTS

| 2001/0039469 A1* | 11/2001 | Nishimura | ............. B60Q 1/085 701/49 |
| 2008/0198372 A1* | 8/2008 | Pan | ........................ B60Q 1/38 356/121 |

(Continued)

*Primary Examiner* — Wei (Victor) Y Chan
(74) *Attorney, Agent, or Firm* — Morgan, Lewis & Bockius LLP

(57) ABSTRACT

The present disclosure relates to a headlamp control apparatus including a first determination unit configured to, when information regarding a distance from a speed breaker from a detection device included in a vehicle, determine whether the distance from the speed breaker is smaller than a predetermined first threshold distance; a second determination unit configured to, when information regarding an inclination is received from an inclination detection device included in the vehicle, determine whether the inclination is a predetermined first inclination corresponding to an entry into the speed breaker or a predetermined second inclination corresponding to moving off of the speed breaker; and a control unit configured to control a high-beam lamp or adjusting brightness of the high-beam lamp not to shine forward with respect to when it is determined that the distance from the speed breaker is smaller than the first threshold distance, configured to control a general-beam lamp or adjusting brightness of the general-beam lamp to shine forward and downward with respect to the vehicle when it is determined that the inclination is the first inclination, and configured to control the high-beam lamp and the general-beam lamp to return to previous states thereof when it is determined that the inclination is changed from the first inclination to the second inclination.

20 Claims, 8 Drawing Sheets

(51) Int. Cl.
*H05B 45/46* (2020.01)
*B60Q 1/26* (2006.01)
*B60Q 9/00* (2006.01)

(52) U.S. Cl.
CPC ...... *B60Q 2300/13* (2013.01); *B60Q 2300/14* (2013.01); *B60Q 2300/32* (2013.01); *B60Q 2300/324* (2013.01)

(58) Field of Classification Search
CPC ........ B60Q 2300/324; B60Q 2300/112; B60Q 9/00; B60Q 2300/21; B60Q 1/52; B60Q 2300/056; B60Q 2300/146; B60Q 2300/41; B60Q 11/00; B60Q 1/0023; B60Q 1/085; B60Q 1/34; B60Q 1/346; B60Q 2300/054; B60Q 2300/31; B60Q 2300/42; B60Q 1/08; B60Q 1/12; B60Q 1/18; B60Q 2200/38; B60Q 2300/13; B60Q 2300/134; B60Q 9/002; B60Q 9/008

See application file for complete search history.

(56) References Cited

U.S. PATENT DOCUMENTS

| 2009/0279317 | A1* | 11/2009 | Tatara | B60Q 1/12 |
| | | | | 362/465 |
| 2010/0165102 | A1* | 7/2010 | Klebanov | B60Q 1/115 |
| | | | | 348/135 |
| 2014/0129081 | A1* | 5/2014 | Ehlgen | B60Q 1/10 |
| | | | | 701/36 |
| 2015/0073654 | A1* | 3/2015 | Foltin | B60Q 1/115 |
| | | | | 701/36 |
| 2017/0327030 | A1* | 11/2017 | Kim | B60Q 1/115 |
| 2018/0009374 | A1* | 1/2018 | Kim | B60Q 1/2607 |

* cited by examiner

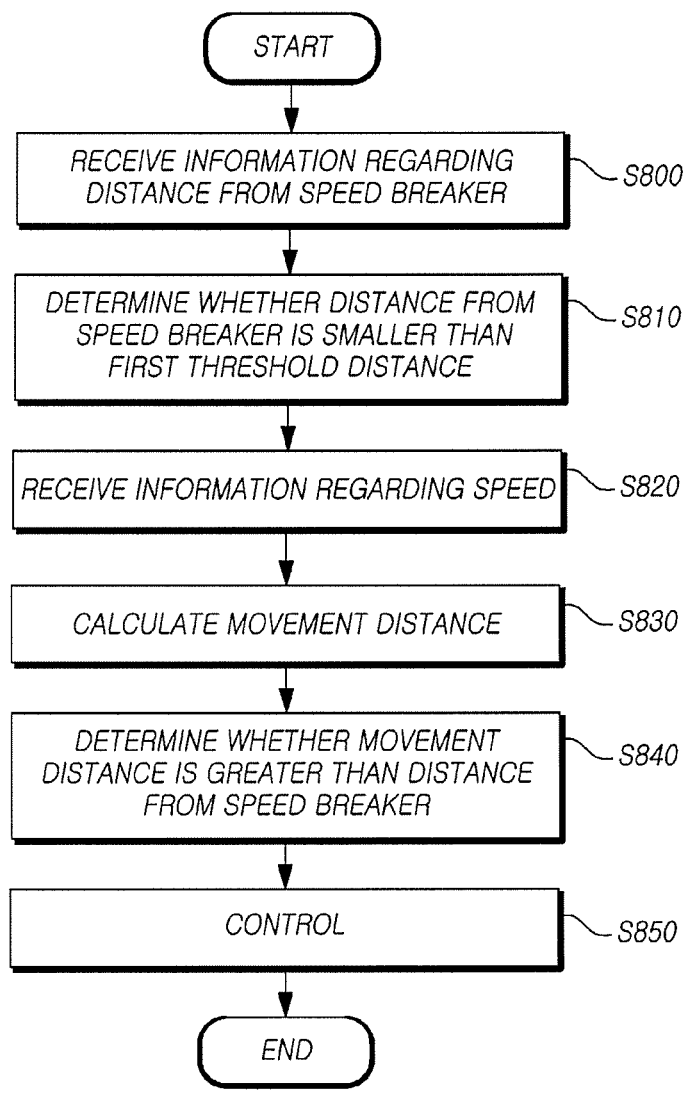

HEADLAMP CONTROL APPARATUS AND METHOD FOR PREVENTING LIGHT POLLUTION CAUSED BY SPEED BREAKER

CROSS REFERENCE TO RELATED APPLICATION

This application claims priority from Korean Patent Application No. 10-2017-0100094, filed on Aug. 8, 2017, which is hereby incorporated by reference for all purposes as if fully set forth herein.

BACKGROUND OF THE INVENTION

1. Field of the Invention

The present disclosure relates to a headlamp control apparatus and method capable of preventing light pollution caused by a speed breaker, and more particularly, to a headlamp control apparatus and method for illuminating the same region even when an angle between a vehicle and a ground surface changes due to the vehicle moving onto a speed breaker.

2. Description of the Prior Art

Generally, during nighttime driving, a driver turns on a low-beam lamp included in a headlamp to secure his or her field of vision.

On the other hand, speed breakers with predetermined inclinations are present in residential areas in order to prevent overspeeding. When a vehicle passes over a speed breaker while a driver turns on a low-beam lamp included in headlamp, the front of the vehicle is raised such that the headlamp illuminates the risen area.

This may cause the driver to not be able to recognize the road ahead and also may obstruct the field of vision of a driver of an oncoming vehicle on the opposite lane.

Also, on an actual road, there may be height-constant speed breakers other than height-varying speed breakers.

In this case, the height-constant speed breakers do not cause above-described problems, but there is a need to develop a headlamp control apparatus and method capable of distinguishing a height-varying speed breaker from a height-constant speed breaker.

However, the headlamp control apparatus and method capable of distinguishing a height-varying speed breaker from a height-constant speed breaker have yet to be developed.

SUMMARY OF THE INVENTION

In the foregoing background, embodiments of the present disclosure are to provide a headlamp control apparatus and method capable of illuminating the same area even when a vehicle moves onto a speed breaker such that an angle between the vehicle and the ground changes.

According to an aspect, the present disclosure provides a headlamp control apparatus including a first determination unit configured to, when information regarding a distance from a speed breaker from a front-area detection device included in a vehicle, determine whether the distance from the speed breaker is smaller than a predetermined first threshold distance; a second determination unit configured to, when information regarding an inclination is received from an inclination detection device included in the vehicle, determine whether the inclination is a predetermined first inclination corresponding to an entry into the speed breaker or a predetermined second inclination corresponding to moving off of the speed breaker; and a control unit configured to control a high-beam lamp or adjust brightness of the high-beam lamp not to shine forward with respect to the vehicle when it is determined that the distance from the speed breaker is smaller than the first threshold distance, configured to control a general-beam lamp or adjust brightness of the general-beam lamp to shine forward and downward with respect to the vehicle when it is determined to that the inclination is the first inclination, and configured to control the high-beam lamp and the general-beam lamp to return to previous states thereof when it is determined that the inclination is changed from the first inclination to the second inclination.

According to another aspect, the present disclosure provides a headlamp control method including receiving information regarding a distance from a speed breaker from a front-area detection device included in a vehicle; determining whether the distance from the speed breaker is smaller than a predetermined first threshold distance when the information regarding the distance from the speed breaker is received; receiving information regarding an inclination from an inclination detection device included in the vehicle; determining whether the inclination is a predetermined first inclination corresponding to an entry into the speed breaker or a predetermined second inclination corresponding to moving off of the speed breaker when the information regarding the inclination is received; and controlling a high-beam lamp or adjusting brightness of the high-beam lamp not to shine forward with respect to the vehicle when it is determined that the distance from the speed breaker is smaller than the first threshold distance, controlling a general-beam lamp or adjusting brightness of the general-beam lamp to shine forward and downward with respect to the vehicle when it is determined that the inclination is the first inclination, and controlling the high-beam lamp and the general-beam lamp to return to previous states thereof when it is determined that the inclination is changed from the first inclination to the second inclination.

According to still another aspect, the present disclosure provides a headlamp control method including receiving information regarding a distance from a speed breaker from a front-area detection device included in a vehicle; determining whether the distance from the speed breaker is smaller than a predetermined first threshold distance; receiving information regarding a speed from a speed detection device included in the vehicle; calculating a movement distance using the speed; determining whether the movement distance is greater than the distance from the speed breaker; and controlling a high-beam lamp or controlling brightness of the high-beam lamp not to shine forward with respect to the vehicle when it is determined that the distance from the speed breaker is smaller than the first threshold distance and controlling the high-beam lamp to return to a previous state thereof when it is determined that the movement distance is greater than the distance from the speed breaker.

BRIEF DESCRIPTION OF THE DRAWINGS

The above and other aspects, features and advantages of the present disclosure will be more apparent from the following detailed description taken in conjunction with the accompanying drawings, in which:

FIG. 8 is a view showing a flowchart of a headlamp control method according to another embodiment of the present disclosure.

DETAILED DESCRIPTION OF THE EXEMPLARY EMBODIMENTS

Figure 1:
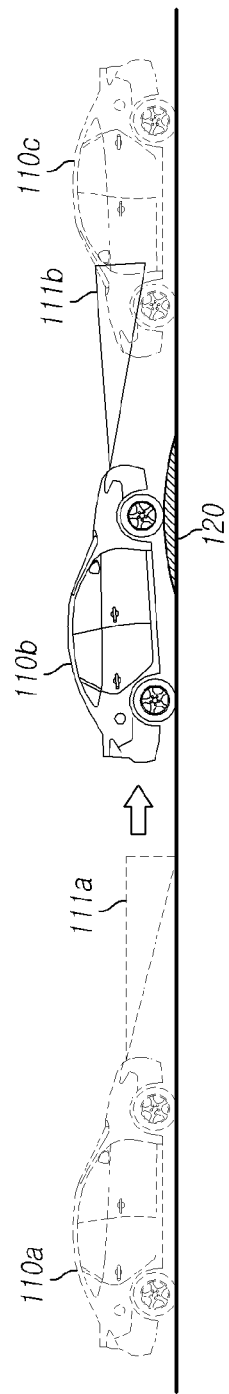
FIG. 1 is a view showing an example for explaining a problem that may occur in a general headlamp control apparatus.

Hereinafter, embodiments of the present disclosure will be described in detail with reference to the accompanying drawings. In adding reference numerals to elements in each figure, it should be noted that the same elements will be designated by the same reference numerals, if possible, although they are shown in different drawings. Further, in the following description of the present disclosure, a detailed description of known functions and configurations incorporated herein will be omitted when it is determined that the description may make the subject matter of the present invention rather unclear.

In addition, terms such as first, second, A, B, (a), (b) or the like may be used herein when describing components of the present disclosure. Each of these terminologies is not used to define an essence, order, sequence, or number of a corresponding component but used merely to distinguish the corresponding component from other component(s). It should be noted that if it is described in the specification that one component is "connected," "coupled" or "joined" to another component, the former may be directly "connected," "coupled" or "joined" to the latter or "connected," "coupled" or "joined" to the latter via another component.

FIG. 1 is a view showing an example for explaining problems that may occur in a general headlamp control apparatus.

Referring to FIG. 1, when a vehicle 110a is traveling before a speed breaker 120, a general headlamp control apparatus illuminates a first area 111a corresponding to a predetermined angle or less inclined with respect to a ground surface so that a driver of the vehicle 110a easily recognizes a situation ahead. In addition, this obstructs the view of a driver of an oncoming vehicle 110c traveling in the opposite direction.

When a vehicle 110b is traveling over a speed breaker 120, a general headlamp control apparatus, which is set to illuminate an area corresponding to a predetermined angle or less as described above, may illuminate a second area 111b greater than the area. The second area 111b illuminated in this situation may cause a driver of the vehicle 110b to not be able to recognize a situation ahead and also may obstruct the view of a driver of an oncoming vehicle 110c traveling in the opposite direction to the vehicle 110b.

Such light pollution may adversely affect not only drivers of vehicles but also residents living in a nearby residential area.

Hereinafter, a headlamp control apparatus and method of the present disclosure, which can solve the problems caused by a general control headlamp apparatus that is set and operated to illuminate an area corresponding to a predetermined angle or less as described above, will be described in detail.

Figure 2:
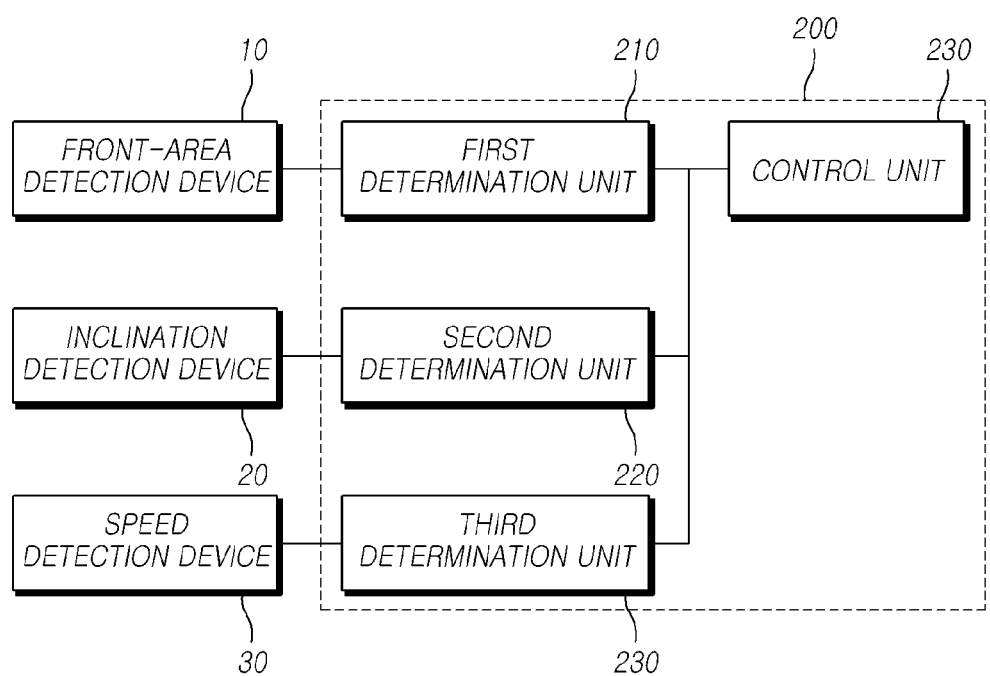
FIG. 2 is a view showing a configuration of a headlamp control apparatus according to an embodiment of the present disclosure.

FIG. 2 is a view showing a configuration of a headlamp control apparatus according to an embodiment of the present disclosure.

Referring to FIG. 2, a headlamp control apparatus 200 according to an embodiment of the present disclosure may include a first determination unit 210 configured to determine whether a distance from a speed breaker is smaller than a first threshold distance when information regarding the distance from the speed breaker is received from a front-area detection device 10 included in a vehicle; a second determination unit 220 configured to determine whether an inclination is a first inclination corresponding to an entry into the speed breaker or a second inclination corresponding to moving off of the speed breaker when information regarding the inclination is received from an inclination detection device 20 included in the vehicle; and a control unit 230 configured to control a high-beam lamp not to shine forward with respect to the vehicle or to adjust the brightness of the high-beam lamp when it is determined that the distance from the speed breaker is smaller than the first threshold distance, configured to control a general-beam lamp to shine forward and downward with respect to the vehicle or to adjust the brightness of the general-beam lamp when it is determined that the inclination is the first inclination, and configured to control the high-beam lamp and the general-beam lamp to return to previous states thereof when it is determined that the inclination is changed from the first inclination to the second inclination.

The front-area detection device 10 included in the vehicle may be a detection device, such as a camera, a radar, a lidar, or an ultrasonic sensor, installed to monitor an area in front of the vehicle to detect an object ahead. Also, the front-area detection device 10 may further include a navigation device, a GPS sensor, and the like, which are configured to detect the vehicle's location and moving path.

As an example, the camera may include a condensing unit configured to receive light, an imaging unit configured to image the received light, and an adjustment device configured to perform state adjustment. The condensing unit, which is a component for receiving light and enabling an image to be focused on the imaging unit, includes various types of units ranging from a simple small hole, such as a pinhole camera, to a complex camera using various kinds of multi-lenses. A condensing unit of a general camera includes a lens, an aperture, and a device for adjusting a distance of the lens. Generally, the condensing unit may be referred to as a photo lens. The imaging unit is a component for focusing an image due to light oncoming from the condensing unit. A film camera makes a photo by placing a photosensitive film on the imaging unit, creating an image, and developing and printing the image. On the other hand, a digital camera stores digital images formed as electric signals in a storage medium in various types of image films, by placing a device for converting optical signals into electric signals (e.g., complementary metal-oxide semiconductor (CMOS), charge-coupled device (CCD), or the like) on the imaging unit. The adjustment device, which is a component for operating to obtain a desired image, may representatively include an aperture configured to adjust the size of a hole of the condensing unit, a shutter configured to accept or block light, and the like. As an example, a proper image may be obtained by narrowing the aperture to reduce the amount of light in bright places and also by widening the aperture to increase the amount of light in dark places. In addition, a fast movement of an athlete may be captured as still images by speeding up the operation of the shutter. Other devices such as a flash for capturing objects in dark places and a view finder for previewing an object to be captured may be included in the adjustment device.

Unlike this, the radar is an apparatus for measuring a distance from an object by emitting electromagnetic waves and analyzing electromagnetic waves reflected by the object and then returned. When a low-frequency wave having a long wavelength is used, a radar may detect even a small, distant place due to a small attenuation of an electromagnetic wave, but may obtain a poor resolution due to imprecise measurement. On the other hand, when a high-frequency wave having a short wavelength is used, the radar cannot detect a distant place due to a large attenuation caused by absorption or reflection by water vapor, snow, rain, and the like contained in the air, but may obtain a high resolution. According to such characteristics, low-frequency electrical waves are used when it is necessary to quickly detect a remote target like an air search radar and a terrain radar, while high-frequency electrical waves are used when it is necessary to precisely measure the shape or size of a target like a fire-control radar or the like.

In addition, the lidar, which refers to a technique and apparatus for emitting a laser beam and measuring physical properties such as a distance, concentration, velocity, shape and the like of an object to be measured on the basis of time, intensity, a frequency change, a polarization state change of a scattered or reflected laser beam, may measure a distance using a laser beam in the same principle as that of the laser observing a round trip time of the object using microwaves. The lidar may create a 3D model of a building and a geographical shape with high accuracy by using a tripod on the ground and also may be installed in an aircraft and a satellite to create a model of an Earth's surface.

Also, the ultrasonic sensor is a device for detecting the distance, location, and orientation of an object by using the characteristics of ultrasonic waves, in which diffraction phenomenon rarely occurs, the shadow of an object is easily generated, and transmission is made in only one direction, like light, due to the shortening of wavelength along with an increase in frequency. In order to detect the distance, the ultrasonic sensor may detect the distance from the object on the basis of a time taken by ultrasonic pulse waves emitted by the ultrasonic sensor to return to the ultrasonic sensor.

The navigation device is configured to generate a route of a vehicle using road environment information and location information of the vehicle, which are stored in advance or received in real time, and to provide various environmental information such as a danger, a speed breaker, and a speed limit on the route on which the vehicle is traveling.

The GPS sensor, which is a device for acquiring the position of a vehicle, may be installed in a navigation device or may be provided in a vehicle as a separate sensor.

When information regarding the distance from the speed breaker is received from the front-area detection device 10, which is capable of operating as described above to detect the distance from the speed breaker, the first determination unit 210 of the headlamp control apparatus 200 according to an embodiment of the present disclosure may determine whether the distance from the speed breaker is smaller than a predetermined first threshold distance. The predetermined first threshold distance, which is a distance based on experimental data, may be a distance that may minimize an inconvenience that the driver of the vehicle may feel while recognizing a situation ahead when the high-beam lamp included in the headlamp of the vehicle does not shine forward with respect to the vehicle or when the brightness of the high-beam lamp is decreased.

The inclination detection device 20 included in the vehicle may be a detection device which is designed to monitor the vehicle's inclination and which includes a gravity sensor or a height sensor capable of detecting an inclination of the vehicle's body with respect to a predetermined center line (e.g., a horizontal line).

As an example, the gravity sensor is a sensor capable of detecting gravity by detecting movement of a roller in a differential transformer that stops at the center of a coil when gravity is not provided.

In detail, the roller in the differential transformer normally stops at the center of the coil, but the magnitude of voltage may occur depending on the roller's displacement in which the roller moves when gravity is applied to the vehicle's body. Thus, the gravity sensor may detect gravity by using the magnitude of voltage that has occurred.

Unlike this, the height sensor is connected to a lower control arm and a sensor body by using a lever and a load and may include one height sensor installed on each of the front and rear sides of the vehicle to detect the locations of the vehicle's shaft and body depending on a change in height of the vehicle when the amount of rotation of the lever is delivered to the sensors.

Normally, the height sensor installed at the front side may include four photointerrupters, and the height sensor installed at the rear side may include three photointerrupters.

When information regarding the inclination is received from the inclination detection device 20, which is capable of operating as described above to detect the vehicle's inclination, the second determination unit 220 of the headlamp control apparatus 200 according to an embodiment of the present disclosure may determine whether the vehicle inclination is a predetermined first inclination corresponding to an entry into a speed breaker or a predetermined second inclination corresponding to moving off of a speed breaker.

The predetermined first and second inclinations, each of which is an inclination based on experimental data, may be values based on errors in inclination that may occur when the vehicle moves onto or off of a speed breaker installed according to traffic regulations. Alternatively, the first and second inclinations may be values determined through experimental data depending on the height of a speed breaker and the length and axle clearance of a vehicle.

In more detail, the first and second inclinations may be values based on errors in inclination that change when the vehicle moves onto or off of a speed breaker installed according to traffic regulations. It will be appreciated that even in this case, the first and second inclinations may be set for each vehicle on the basis of the length of a vehicle, the distance between a front wheel and a rear wheel, and the like, which are set differently for each vehicle.

The control unit 230 of the headlamp control apparatus 200 according to an embodiment of the present disclosure may control the high-beam lamp included in the headlamp not to shine forward with respect to the vehicle when the first determination unit 210 determines that the distance from the speed breaker is smaller than the first threshold distance, may control the general-beam lamp included in the headlamp to shine forward and downward with respect to the vehicle when the second determination unit 220 determines that the inclination is the first inclination, and may control the high-beam lamp and the general-beam lamp to return to previous states thereof when the second determination unit 220 determines that the inclination is the second inclination.

Alternatively, the control unit 230 of the headlamp control apparatus 200 may control the brightness of the high-beam lamp included in the headlamp to decease so that the high-beam lamp does not shine forward with respect to the vehicle when the first determination unit 210 determines that the distance from the speed breaker is smaller than the first threshold distance, may control the brightness of the general-beam lamp included in the headlamp to decrease when the second determination unit 220 determines that the inclination is the first inclination, and may control the brightness of the high-beam lamp and the brightness of the general-beam lamp to return to previous states thereof when the second determination unit 220 determines that the inclination is the second inclination.

The high-beam lamp may be a lamp for shining forward with respect to the vehicle, and the general-beam lamp may be a lamp for shining forward with respect to the vehicle at a lower angle than that of the high-beam lamp while the angle is adjusted to a plurality of predetermined angles.

As an example, the general-beam lamp may correspond to a lamp operating when an "on" signal for turning on the headlamp in a general vehicle, and the high-beam lamp may correspond to a lamp additionally operating when an upward signal is provided to the headlamp that is turned on by the "on" signal provided in the general vehicle.

Meanwhile, the lamp operating when the "on" signal is provided in the general vehicle shines forward with respect to the vehicle at a constant angle, but the general-beam lamp according to an embodiment of the present disclosure shines forward with respect to the vehicle at a plurality of predetermined angles. To this end, the general-beam lamp according to an embodiment of the present disclosure may further include a function of adjusting the angle to another angle depending on signals corresponding to the plurality of predetermined angles and then shining forward with respect to the vehicle.

As an example, the function may be achieved by adjusting the angle of a light source, adjusting an angle at which emitted light is reflected, or adjusting an installation angle of the general-beam lamp. This is not to be construed as a limited example.

The headlamp control apparatus 200 according to an embodiment of the present disclosure, which operates as described above, can solve the above-described problems that may be caused by the general headlamp control apparatus.

The operations and effects of the headlamp control apparatus according to an embodiment of the present invention will be described in detail below with reference to FIGS. 3 and 4.

Figure 3:
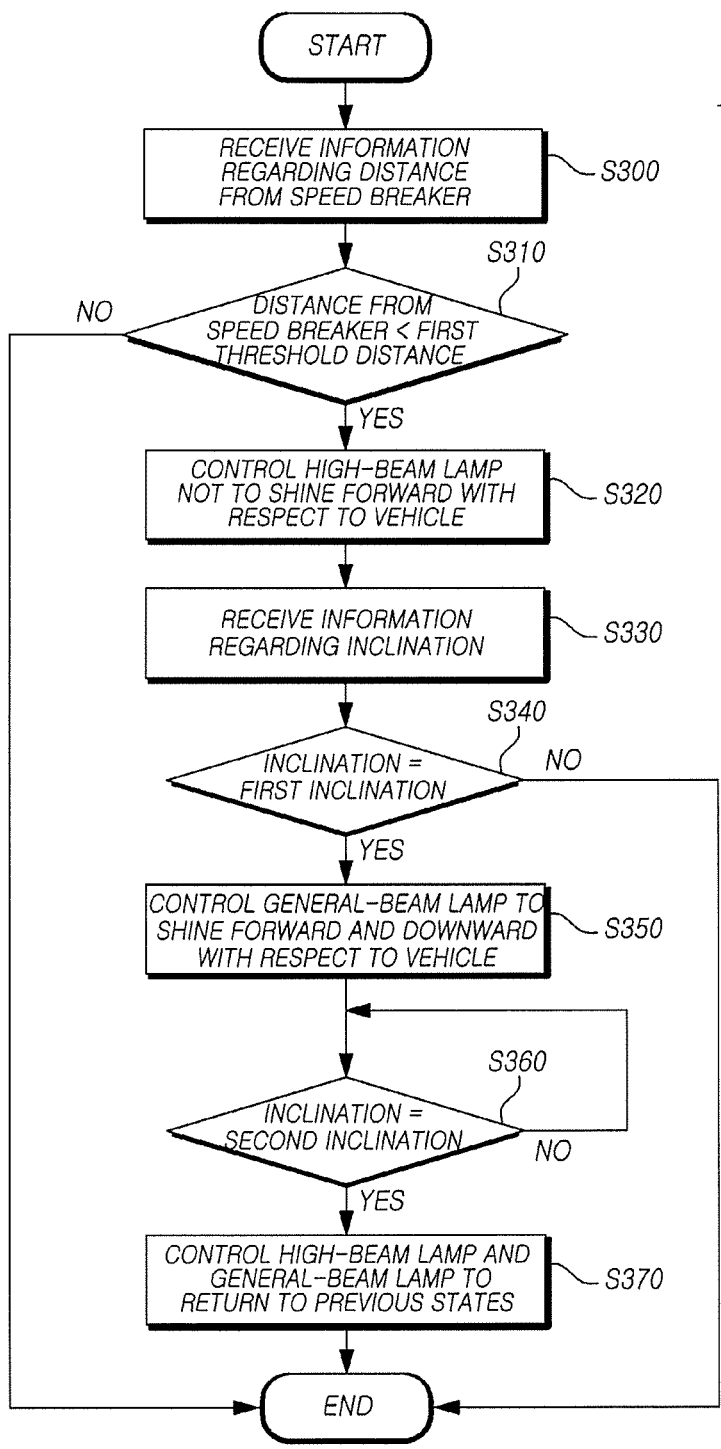
FIG. 3 is a view showing an example for explaining an operation of a headlamp control apparatus according to an embodiment of the present disclosure.
Figure 4:
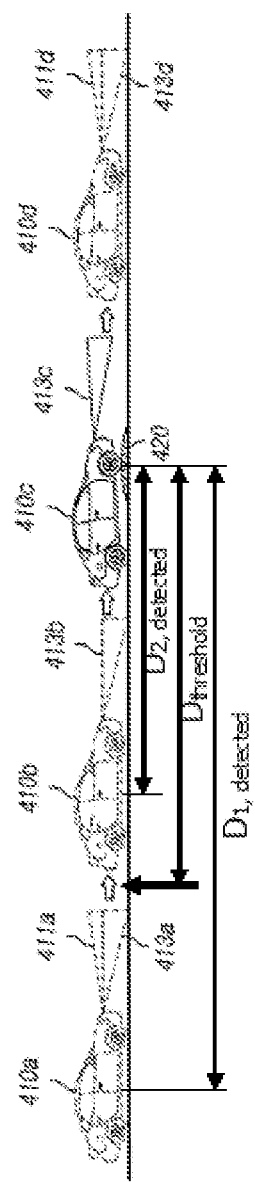
FIG. 4 is a view showing an example for explaining effects of a headlamp control apparatus according to an embodiment of the present disclosure.

FIGS. 3 and 4 are views showing examples for explaining the operations and effects of the headlamp control apparatus according to an embodiment of the present disclosure.

Referring to FIG. 3, when information regarding a distance from a speed breaker is received from the front-area detection device included in the vehicle (S300), the first determination unit of the headlamp control apparatus according to an embodiment of the present invention may determine whether the distance from the speed breaker is smaller than a predetermined first threshold distance (S310).

In S300, the information regarding the distance from the speed breaker may be received from the front-area detection device by using a controller area network (CAN), which is a network applied to the vehicle.

The front-area detection device may be a camera, a radar, a lidar, a navigation device, a GPS sensor, or an ultrasonic sensor which is capable of detecting the distance from the speed breaker, and the first threshold distance may be a distance that may minimize an inconvenience that the driver of the vehicle may feel while recognizing a situation ahead when the high-beam lamp included in the headlamp of the vehicle does not shine forward with respect to the vehicle or when the brightness of the high-beam lamp is decreased. As necessary, the first threshold distance may be dynamically set depending on a predetermined amount of reduction in the brightness, by which the brightness of the high-beam lamp is adjusted.

In S310, when the first determination unit determines that the distance from the speed breaker is smaller than the predetermined first threshold distance (yes), the control unit according to an embodiment of the present disclosure may control the high-beam lamp included in the headlamp of the vehicle not to shine forward with respect to the vehicle (S320).

As an example, by turning off the high-beam lamp, the control unit may perform S320.

As another example, by decreasing the brightness of the high-beam lamp, the control unit may perform S320.

When information regarding an inclination is received from the inclination detection device included in the vehicle (S330), the second determination unit according to an embodiment of the present disclosure may determine whether the inclination is a predetermined first inclination corresponding to an entry into the speed breaker (S340) or a predetermined second inclination corresponding to moving off of the speed breaker (S360).

In S330, the information regarding the vehicle's inclination may be received from the inclination detection device by using the CAN, which is a network applied to the vehicle.

In S340, when the second determination unit determines that the inclination is the predetermined first inclination corresponding to the entry into the speed breaker (yes), the control unit may control the general-beam lamp included in the headlamp to shine forward and downward with respect to the vehicle (S350).

Also, the control unit may control the brightness of the general-beam lamp included in the headlamp to decrease. The control unit may control both or only one of the angle and the brightness of the headlamp.

In S360, when the second determination unit determines that the inclination is the predetermined second inclination corresponding to moving off of the speed breaker (yes), the control unit may control the high-bream lamp and the general-beam lamp, which are controlled in S320 and S350, to return to previous states thereof (S370).

The headlamp control apparatus according to an embodiment of the present invention, which operates as shown in FIG. 3, may operate as shown in FIG. 4 when the vehicle is traveling on a road including a speed breaker.

Referring to FIG. 4, after receiving information regarding a distance from a speed breaker 420 ($D_{1,detected}$) greater than the predetermined first threshold distance ($D_{threshold}$) and prior to receiving information regarding the first inclination or the second inclination, the control unit may control the high-beam lamp to shine forward with respect to the vehicle and may control the general-beam lamp to shine forward with respect to the vehicle at a lower angle than that of the high-beam lamp. Whether the information regarding the distance from the speed breaker 420 greater than the first threshold distance is received may be determined by the first determination unit.

Thus, the vehicle 410a may illuminate a high-beam area 411a ahead by using the high-beam lamp and illuminate a first general-beam area 413a ahead by using the general-beam lamp.

Subsequently, when information regarding the distance from the speed breaker 420 ($D_{2,detected}$) smaller than the predetermined first threshold distance ($D_{threshold}$) is received from the front-area detection device of the vehicle 410b after a first time, the control unit may control the high-beam lamp not to shine forward with respect to the vehicle and may control the general-beam lamp to continuously shine forward with respect to the vehicle. Whether the information regarding the distance from the speed breaker 420 smaller than the first threshold distance is received may be determined by the first determination unit.

Thus, the vehicle 410b may illuminate a first general-beam area 413b in front of the vehicle by using the general-beam lamp.

Subsequently, when the first inclination corresponding to the entry into the speed breaker 420 is received from the inclination detection device included in the vehicle 410c after a second time, the control unit may control the general-beam lamp to illuminate a second general-beam area 413c, which is in front of the vehicle downward. Whether the first inclination corresponding to the entry into the speed breaker 420 may be determined by the second determination unit.

Thus, the general-beam lamp of the vehicle 410c may illuminate the same area with reference to the ground surface, irrespective of whether the vehicle 410c moves onto the speed breaker 420. Strictly speaking, it is not possible to illuminate the same area due to a change in height of the speed breaker 420, but minor differences are ignored.

Subsequently, when the second inclination corresponding to moving off of the speed breaker 420 is received from the inclination detection device included in the vehicle 410d after a third time, the control unit may control the high-beam lamp and the general-beam lamp to return to states prior to the control being performed due to the speed breaker 420. Whether the second inclination corresponding to moving off of the speed breaker 420 may be determined by the second determination unit.

Thus, the vehicle 410d may illuminate a high-beam area 411d ahead by using the high-beam lamp and illuminate a first general-beam area 413d ahead by using the general-beam lamp. The vehicle 410d and the high-beam area 411d and the first general-beam area 413d illuminated by the vehicle 410d may be the same as the vehicle 410a and the high-beam area 411a and the first general-beam area 413a illuminated by the vehicle 410a, respectively.

The areas illuminated by the high-beam lamp and the general-beam lamp have been described with reference to FIG. 4, but the adjustment of the brightness of the beams may be accompanied as described above.

The on/off operation for the high-beam lamp and the angle control operation for the general-beam lamp will be mainly described below, but the description may also be applied to the control of the brightness of the high-beam lamp and the general-beam lamp as described above. Also, two or more of the brightness control operation, the lamp on/off operation, and the angle control operation may be applied at the same time.

The headlamp control apparatus according to an embodiment of the present disclosure, which operates as described with reference to FIGS. 3 and 4, may solve the problems that may be caused by the general headlamp control apparatus described with reference to FIG. 1.

Meanwhile, on an actual road, there may be a height-constant speed breaker (hereinafter referred to as a speed breaker painting) other than a height-varying speed breaker.

A headlamp control device according to another embodiment of the present disclosure, which may operate normally even when there is a speed breaker painting, will be described below in detail.

The headlamp control apparatus according to another embodiment of the present disclosure may be the same as the headlamp control apparatus according to an embodiment of the present invention, which has been described with reference to FIGS. 2 to 4, except for further including a third determination unit 230 configured to, when information regarding a speed is received from a speed detection device 30 included in the vehicle, determine whether a movement distance calculated using the speed is greater than the distance from the speed breaker. The speed detection device 30 may be a device including a wheel speed sensor.

Thus, a control unit according to another embodiment of the present disclosure may include a function of controlling the high-beam lamp to return its previous state when it is determined that the inclination is not equal to the first inclination and that the calculated movement distance is greater than the distance from the speed breaker, as well as the functions performed by the control unit of the headlamp control apparatus according to an embodiment of the present disclosure.

Figure 5:
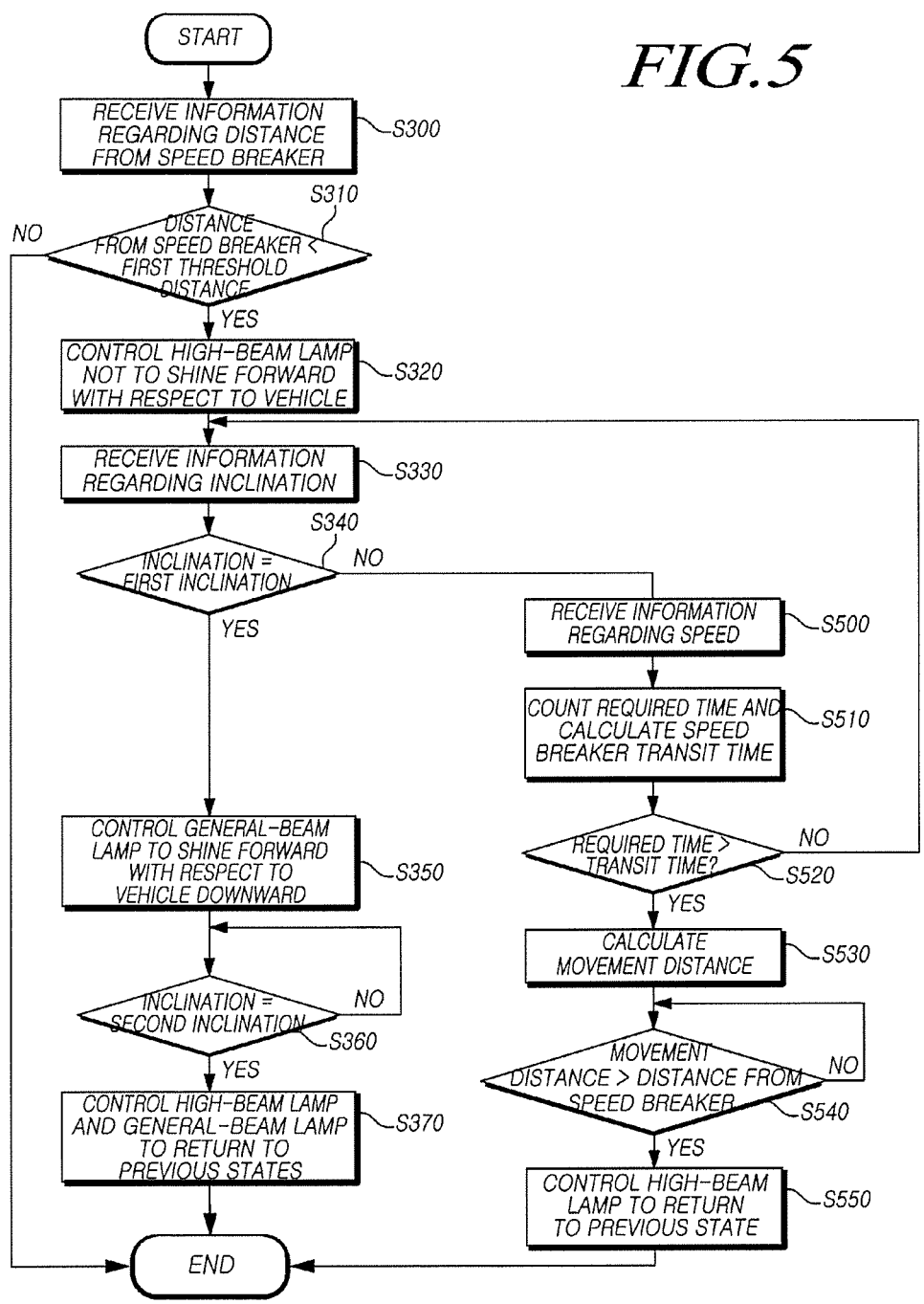
FIG. 5 is a view showing an example for explaining an operation of a headlamp control apparatus according to another embodiment of the present disclosure.
Figure 6:
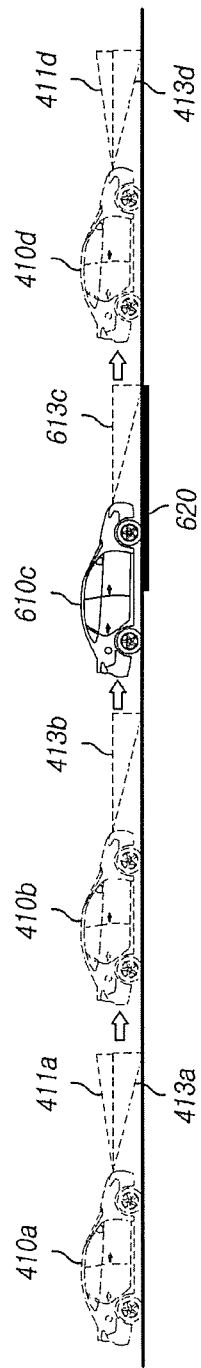
FIG. 6 is a view showing an example for explaining effects of a headlamp control apparatus according to another embodiment of the present disclosure.

FIGS. 5 and 6 are views showing examples for explaining the operations and effects of the headlamp control apparatus according to another embodiment of the present disclosure.

Referring to FIG. 5, the headlamp control apparatus according to another embodiment of the present invention may perform S300 to S370, which are performed by the headlamp control apparatus according to an embodiment of the present disclosure shown in FIG. 3.

However, when it is determined in S340 that the inclination is not equal to the first inclination (no), the headlamp control apparatus according to another embodiment of the present invention my receive information regarding a speed from the speed detection device 30 included in the vehicle (S500). The third determination unit 230 may count a required time and calculate a speed breaker transit time on the basis of the speed acquired in S500 (S510) and may determine whether the counted required time is greater than the calculated transit time (S520).

Thus, when it is determined that the required time is not greater than the transit time, S330 and S340 may be performed again. When the determination in S340, which is performed again, is "no," S500 and S520 may be performed again.

When it is determined in S520 that the required time is greater than the transit time (yes), the third determination unit 230 calculates a movement distance using the received speed and the counted required time (S530), and determines whether the calculated movement distance is greater than the received distance from the speed breaker (S540). When it is determined in S540 that the movement distance is not greater than the distance from the speed breaker (no), S540 may be performed again.

Unlike this, when it is determined in S540 that the movement distance is greater than the distance from the speed breaker (yes), the control unit may control the high-beam lamp to return to its previous state (S550).

Unlike in FIG. 5, a speed breaker and a speed breaker painting may be determined in different ways.

For example, when a speed breaker is detected not by a radar, a lidar, a ultrasonic sensor, or the like of the front-area detection device but by a camera sensor, the speed breaker may be determined as a speed breaker painting. This is due to differences between the camera, which checks a pattern painted on the speed breaker through image processing, and the radar, lidar, and ultrasonic sensor, which checks signals differently reflected depending on a physical shape.

Similarly, when a speed breaker is detected not by the navigation device but by the camera sensor, the speed breaker may be determined as a speed breaker painting.

The headlamp control apparatus according to another embodiment of the present invention, which operates as shown in FIG. 5, may operate as shown in FIG. 6 when the vehicle is traveling on a road including a speed breaker.

Referring to FIG. 6, after receiving information regarding a distance from a speed breaker painting 620 greater than the predetermined first threshold distance and prior to receiving information regarding the first inclination or the second inclination, the control unit may control the high-beam lamp to shine forward with respect to the vehicle and may control the general-beam lamp to shine forward with respect to the vehicle at a lower angle than that of the high-beam lamp. Whether the information regarding the distance from the speed breaker painting 620 greater than the first threshold distance is received may be determined by the first determination unit.

Thus, the vehicle 410a may illuminate a high-beam area 411a ahead by using the high-beam lamp and illuminate a first general-beam area 413a ahead by using the general-beam lamp.

Subsequently, when information regarding the distance from the speed breaker painting 620 smaller than the predetermined first threshold distance is received from the vehicle 410b after a first time, the control unit may control the high-beam lamp not to shine forward with respect to the vehicle. Here, the front-area detection device detecting the speed breaker painting 620 may be limited to a case in which the front-area detection device is a camera. Also, whether the information regarding the distance from the speed breaker painting 620 smaller than the first threshold distance is received may be determined by the first determination unit.

Thus, the vehicle 410b may illuminate a first general-beam area 413b in front of the vehicle by using the general-beam lamp.

Subsequently, when the first inclination is not received from the inclination detection device included in the vehicle 610c after a second time because the vehicle 610c moves onto the speed breaker painting 620, the general-beam lamp may illuminate the same general beam area 613c.

In this case, when information regarding a speed is received from the speed detection device 30 included in the vehicle, the third determination unit 230 may count a required time, calculate a speed breaker transit time on the basis of the speed and the distance from the speed breaker, determine whether the counted required time is greater than the calculated transit time, calculate a movement distance using the speed and the counted required time, and determine whether the calculated movement distance is greater than the distance from the speed breaker.

Subsequently, when the third determination unit 230 determines that the calculated movement distance is greater than the distance from the speed breaker after a third time, the control unit may control the high-beam lamp to return to a state prior to the control being performed due to the speed breaker painting 620.

Thus, the vehicle 410d may illuminate a high-beam area 411d ahead by using the high-beam lamp and illuminate a first general-beam area 413d ahead by using the general-beam lamp. The vehicle 410d and the high-beam area 411d and the first general-beam area 413d illuminated by the vehicle 410d may be the same as the vehicle 410a and the high-beam area 411a and the first general-beam area 413a illuminated by the vehicle 610a, respectively.

The headlamp control apparatus according to another embodiment of the present disclosure, which operates as described with reference to FIGS. 5 and 6, may solve the problems that may be caused by the general headlamp control apparatus described with reference to FIG. 1 and also may operate normally even when a speed breaker painting rather than a speed breaker is present on a road.

Meanwhile, a distance between the vehicle and the speed breaker (or the speed breaker painting) may be obtained through a difference between the vehicle's location information and the speed breaker's location information that are acquired from the navigation device included in the vehicle. The distance obtained in this way is utilized through a comparison operation with the first threshold distance.

Alternatively, information regarding the distance from the speed breaker may be calculated using the vehicle's location information and the speed breakers location information acquired through at least one of a radar signal, a lidar signal, a camera signal, and an ultrasonic signal acquired by the front-area detection device included in the vehicle.

A headlamp control method, which is performed by the head control apparatus described with reference to FIGS. 2 to 6, will be described briefly below.

Figure 7:
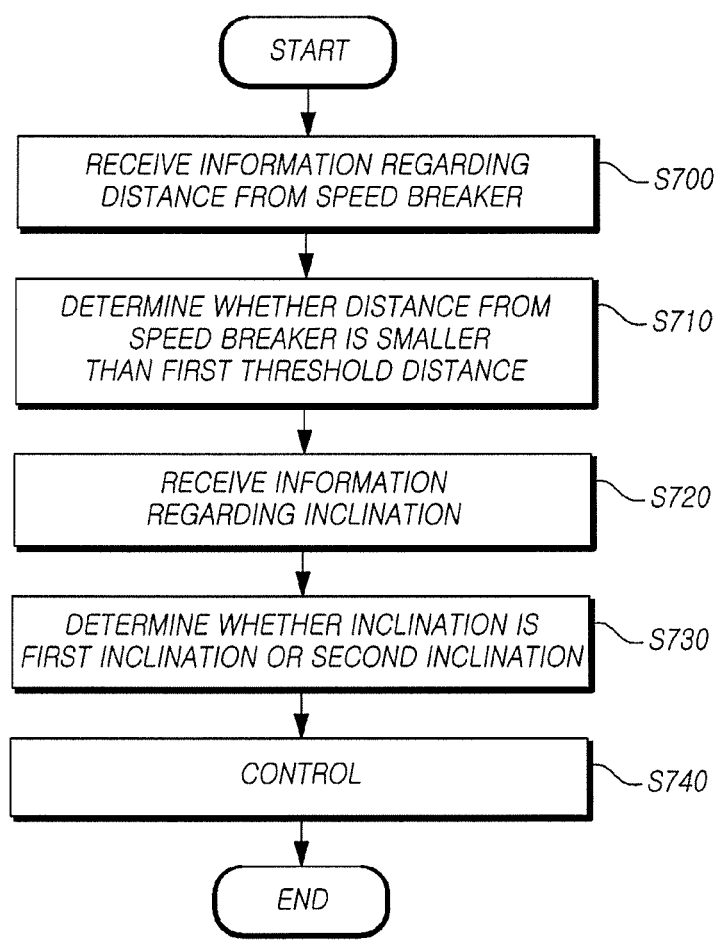
FIG. 7 is a view showing a flowchart of a headlamp control method according to an embodiment of the present disclosure.

FIG. 7 is a view showing a flowchart of the headlamp control method according to an embodiment of the present disclosure.

Referring to FIG. 7, the headlamp control method according to an embodiment of the present disclosure may include receiving information regarding a distance from a speed breaker from a front-area detection device included in a vehicle (S700); determining whether the distance from the speed breaker is smaller than a predetermined first threshold distance (S710); receiving information regarding an inclination from an inclination detection device included in the vehicle (S720); determining whether the inclination is a predetermined first inclination corresponding to an entry into the speed breaker or a predetermined second inclination corresponding to moving off of the speed breaker (S730); and controlling a high-beam lamp or adjusting the brightness of the high-beam lamp not to shine forward with respect to the vehicle when it is determined that the distance from the speed breaker is smaller than the first threshold distance, controlling a general-beam lamp or adjusting the brightness of the general-beam lamp to shine forward and downward with respect to the vehicle when it is determined that the inclination is the first inclination, and controlling the high-beam lamp and the general-beam lamp to return to previous states thereof when it is determined that the inclination is changed from the first inclination to the second inclination (S740).

The front-area detection device included in the vehicle may be a detection device, such as a camera, a radar, a lidar, a navigation device, a GPS sensor, or an ultrasonic sensor, installed to monitor an area in front of the vehicle to detect an object ahead.

The receiving of the information regarding the distance from the speed breaker (S700) of the headlamp control method according to an embodiment of the present disclosure may include receiving the information regarding the distance from the speed breaker from the front-area detection device, which is capable of operating as described above to detect the distance from the speed breaker, using a controller area network (CAN), which is a network applied to the vehicle.

Subsequently, the headlamp control method according to an embodiment of the present disclosure may include determining whether the distance from the speed breaker is smaller than the first threshold distance (S710).

The predetermined first threshold distance, which is a distance based on experimental data, may be a distance that may minimize an inconvenience that the driver of the vehicle may feel while recognizing a situation ahead when the high-beam lamp included in the headlamp of the vehicle does not shine forward with respect to the vehicle or when the brightness of the high-beam lamp is decreased.

The inclination detection device included in the vehicle may be a detection device designed to monitor the vehicle's inclination and including a gravity sensor or a height sensor capable of detecting an inclination of the vehicle's body with respect to a predetermined center line (e.g., a horizontal line).

As an example, the gravity sensor is a sensor capable of detecting gravity by detecting movement of a roller in a differential transformer that stops at the center of a coil when gravity is not provided.

In detail, the roller in the differential transformer normally stops at the center of the coil, but the gravity sensor may detect gravity by using the magnitude of voltage occurring depending on the roller's displacement in which the roller moves when gravity is applied to the vehicle's body.

Unlike this, the height sensor is connected to a lower control arm and a sensor body by using a lever and a load and may include one height sensor installed on each of the front and rear sides of the vehicle to detect the locations of the vehicle's shaft and body depending on a change in height of the vehicle when the amount of rotation of the lever is delivered to the sensors.

Normally, the height sensor installed at the front side may include four photointerrupters, and the height sensor installed at the rear side may include three photointerrupters.

The receiving of the information regarding the inclination (S720) of the headlamp control method according to an embodiment of the present disclosure may include receiving the information regarding the inclination from the inclination detection device, which is capable of operating as described above to detect the vehicle's inclination, using a controller area network (CAN), which is a network applied to the vehicle.

Subsequently, the headlamp control method according to an embodiment of the present disclosure may include determining whether the inclination is the first inclination or the second inclination (S730).

The predetermined first and second inclinations, each of which is an inclination based on experimental data, may be values considering an error in inclination that may occur when the vehicle moves onto or off of a speed bump installed according to traffic regulations.

In more detail, the first and second inclinations may be values based on errors in inclination that change when the vehicle moves onto or off of a speed to bump installed according to traffic regulations.

The controlling (S740) of the headlamp control method according to an embodiment of the present disclosure may include controlling the high-beam lamp included in the headlamp not to shine forward with respect to the vehicle or adjusting the brightness of the high-beam lamp when it is determined that the distance from the speed breaker is smaller than the first threshold distance, controlling the general-beam lamp included in the headlamp or adjusting the brightness of the general-beam lamp to shine forward and downward with respect to the vehicle when it is determined that the inclination is the first inclination, and controlling the high-beam lamp and the general-beam lamp to return to previous states thereof when it is determined that the inclination is the second inclination.

As an example, the controlling may include decreasing the brightness of the high-beam lamp when the distance from the speed breaker is smaller than the first threshold distance and controlling the brightness of the high-beam lamp to return to its previous state when it is determined that the inclination is changed from the first inclination to the second inclination.

As another example, the controlling may include decreasing the brightness of the general-beam lamp when it is determined that the inclination is the first inclination and controlling the brightness of the general-beam lamp to return to its previous state when it is determined that the inclination is changed from the first inclination to the second inclination.

The high-beam lamp may be a lamp for shining forward with respect to the vehicle, and the general-beam lamp may be a lamp for shining forward with respect to the vehicle at a lower angle than that of the high-beam lamp while the angle is adjusted to a plurality of predetermined angles.

As an example, the general-beam lamp may correspond to a lamp that operates when an "on" signal for turning on the headlamp is provided in a general vehicle. On the other hand, the high-beam lamp may correspond to a lamp that additionally operates when an upward signal is provided to the headlamp that is turned on by the "on" signal provided in the general vehicle.

Meanwhile, the lamp operating when the "on" signal is provided in the general vehicle shines forward with respect to the vehicle at a constant angle, but the general-beam lamp according to an embodiment of the present disclosure shines forward with respect to the vehicle at a plurality of predetermined angles. To this end, the general-beam lamp according to an embodiment of the present disclosure may further include a function of adjusting the angle to another angle depending on signals corresponding to the plurality of predetermined angles and then shining forward with respect to the vehicle.

As an example, the function may be achieved by adjusting the angle of a light source, adjusting an angle at which emitted light is reflected, or adjusting an installation angle of the general beam lamp. This is an example, and is not to be construed as being limited.

The headlamp control method according to an embodiment of the present disclosure, which operates as described above, can solve the above-described problems that may be caused by the general headlamp control apparatus.

FIG. 8 is a view showing a flowchart of a headlamp control method according to another embodiment of the present disclosure.

Referring to FIG. 8, the headlamp control method according to another embodiment of the present disclosure may include receiving information regarding a distance from a speed breaker from a front-area detection device included in a vehicle (S800); determining whether the distance from the speed breaker is smaller than a predetermined first threshold distance (S810); receiving information regarding a speed from a speed detection device included in the vehicle (S820); calculating a movement distance using the speed (S830); determining whether the movement distance is greater than the distance from the speed breaker (S840); and controlling a high-beam lamp or adjusting the brightness of the high-beam lamp not to shine forward with respect to the vehicle when it is determined that the distance from the speed breaker is smaller than the first threshold distance and controlling the high-beam lamp to return to its previous state when it is determined that the movement distance is greater than the distance from the speed breaker (S850).

The front-area detection device included in the vehicle may be a detection device, such as a camera, a radar, a lidar, or an ultrasonic sensor, installed to monitor an area in front of the vehicle to detect an object ahead.

The receiving of the information regarding the distance from the speed breaker (S800) of the headlamp control method according to another embodiment of the present disclosure may include receiving the information regarding the distance from the speed breaker from the front-area detection device, which is capable of operating as described above to detect the distance from the speed breaker, using a controller area network (CAN), which is a network applied to the vehicle.

Subsequently, the headlamp control method according to another embodiment of the present disclosure may include determining whether the distance from the speed breaker is smaller than the first threshold distance (S810).

The predetermined first threshold distance, which is a distance based on experimental data, may be a distance that may minimize an inconvenience that the driver of the vehicle may feel while recognizing a situation ahead when the high-beam lamp included in the headlamp of the vehicle does not shine forward with respect to the vehicle.

The inclination detection device included in the vehicle may be a detection device designed to monitor the vehicle's inclination and including a gravity sensor or a height sensor capable of detecting an inclination of the vehicle's body with respect to a predetermined center line (e.g., a horizontal line).

As an example, the gravity sensor is a sensor capable of detecting gravity by detecting movement of a roller in a differential transformer that stops at the center of a coil when gravity is not provided.

In detail, the roller in the differential transformer normally stops at the center of the coil, but the gravity sensor may detect gravity by using the magnitude of voltage occurring depending on the roller's displacement in which the roller moves when gravity is applied to the vehicle's body.

Unlike this, the height sensor is connected to a lower control arm and a sensor body by using a lever and a load and may include one height sensor installed on each of the front and rear sides of the vehicle to detect the locations of the vehicle's shaft and body depending on a change in height of the vehicle when the amount of rotation of the lever is delivered to the sensors.

Normally, the height sensor installed at the front side may include four photointerrupters, and the height sensor installed at the rear side may include three photointerrupters.

The receiving of the information regarding the speed (S820) of the headlamp control method according to another embodiment of the present invention may include receiving the information regarding the speed from the speed detection device included in the vehicle. The speed detection device may be a device including a wheel speed sensor, and the headlamp control method may be performed using a control area network (CAN), which is a network applied to the vehicle.

The headlamp control method according to another embodiment of the present disclosure may include calculating a movement distance using the received speed (S830).

Subsequently, the headlamp control method according to another embodiment of the present disclosure may include determining whether the calculated movement distance is greater than the distance from the speed breaker (S840).

Subsequently, the controlling (S850) according to another embodiment of the present disclosure may include controlling the high-beam lamp not to shine forward with respect to the vehicle when it is determined in S810 that the distance from the speed breaker is smaller than the first threshold distance and controlling the high-beam lamp to return to its previous state when it is determined in S840 that the movement distance is greater than the distance from the speed breaker.

The headlamp control method according to another embodiment of the present disclosure, which operates as described with reference to FIG. 8, may solve the problems that may be caused by the general headlamp control apparatus described with reference to FIG. 1 and also may be normally performed even when a speed breaker painting rather than a speed breaker is present on a road.

In addition, the headlamp control method of the present disclosure can perform all the operations performed by the headlamp control apparatus of the present disclosure described with reference to FIGS. 2 to 6.

As described above, according to the present disclosure, it is possible to provide a headlamp control apparatus and method capable of illuminating the same area even when a vehicle moves onto a speed breaker such that an angle between the vehicle and the ground changes.

Also, according to the present disclosure, it is possible to provide an apparatus and method for controlling the angle, brightness, or on/off of a headlamp in order to prevent glare to a driver of an oncoming vehicle when a vehicle moves onto a speed breaker.

The foregoing description and the accompanying drawings are exemplary only of the teachings of the present disclosure, and it will be apparent to those skilled in the art that various modifications and variations such as combination, separation, replacement, and changes of components can be made without departing from the essential characteristics of the present disclosure. Also, the embodiments disclosed herein are intended not to limit but to describe the technical spirit of the present disclosure, and the scope of the present disclosure is not limited to the embodiments. The scope of the present disclosure should be construed by the appended claims, and all technical sprits within the scope of their equivalents should be construed as included in the scope of the present disclosure.

What is claimed is:

1. A headlamp control apparatus comprising:
 a first determination unit configured to, when information regarding a distance from a speed breaker to a vehicle is received from a distance detection device included in the vehicle, determine whether or not the distance from the speed breaker is less than a predetermined first threshold distance;
 a second determination unit configured to, when information regarding an inclination is received from an inclination detection device included in the vehicle, determine whether the inclination is a predetermined first inclination corresponding to an entry into the speed breaker or a predetermined second inclination corresponding to moving off of the speed breaker; and a control unit configured to:

control a high-beam lamp or adjust brightness of the high-beam lamp not to shine forward with respect to the vehicle, as a first state of the high-beam lamp, when the first determination unit determines that the distance from the speed breaker is less than the first threshold distance, control a general-beam lamp or adjust brightness of the general-beam lamp to shine forward and downward with respect to the vehicle, as a first state of the general-beam lamp, when the second determination unit determines that the inclination is the first inclination, and control the high-beam lamp and the general-beam lamp to return to previous states of the high-beam and general-beam lamps when the second determination unit determines that the inclination is changed from the first inclination to the second inclination, wherein the previous states of the high-beam and general-beam lamps respectively refer to a state of the high-beam lamp before the high-beam lamp is controlled or adjusted to the first state of the high-beam lamp and to a state of the general-beam lamp before the general-beam lamp is controlled or adjusted to the first state of the general-beam lamp.

2. The headlamp control apparatus of claim 1, further comprising a third determination unit configured to, when information regarding a speed is received from a speed detection device included in the vehicle, determine whether a movement distance calculated using the speed is greater than the distance from the speed breaker, wherein the control unit controls the high-beam lamp to return to the previous state of the high-beam when the second and third determination units determine that the inclination is not equal to the first inclination and that the movement distance is greater than the distance from the speed breaker.

3. The headlamp control apparatus of claim 2, wherein the third determination unit additionally counts a required time when the second determination unit determines that the inclination is not equal to the first inclination, additionally calculates a speed breaker transit time on the basis of the distance from the speed breaker, and additionally determines whether the required time is greater than the transit time, and the second determination unit determines whether the inclination is the first inclination until the required time is greater than the transit time, and wherein when the second and third determination units determine that the inclination is not equal to the first inclination and also that the movement distance is greater than the distance from the speed breaker until the required time is greater than the transit time, the control unit controls the high-beam lamp to return to the previous state of the high-beam.

4. The headlamp control apparatus of claim 1, wherein the high-beam lamp is a lamp for shining forward with respect to the vehicle, and the general-beam lamp is a lamp for shining forward with respect to the vehicle at a lower angle than that of the high-beam lamp, the angle being adjusted to a plurality of predetermined angles.

5. The headlamp control apparatus of claim 1, wherein the distance detection device includes a camera, a radar, a lidar, a navigation device, a GPS sensor, or an ultrasonic sensor, and the inclination detection device includes a gravity sensor or a height sensor.

6. The headlamp control apparatus of claim 1, wherein the information regarding the distance from the speed breaker is calculated using location information of the vehicle and location information of the speed breaker acquired from a navigation device included in the vehicle.

7. The headlamp control apparatus of claim 1, wherein the information regarding the distance from the speed breaker is calculated using the location information of the vehicle and the location information of the speed breaker acquired through at least one of a radar signal, a lidar signal, a camera signal, or an ultrasonic signal acquired by a front-area detection device included in the vehicle.

8. The headlamp control apparatus of claim 1, wherein the control unit decreases the brightness of the high-beam lamp when the first determination unit determines that the distance from the speed breaker is less than the first threshold distance, and controls the brightness of the high-beam lamp to return to the previous state of the high-beam when the second determination unit determines that the inclination is changed from the first inclination to the second inclination.

9. The headlamp control apparatus of claim 1, wherein the control unit decreases the brightness of the general-beam lamp when the second determination unit determines that the inclination is the first inclination, and controls the brightness of the general-beam lamp to return to the previous state of the general-beam when the second determination unit determines that the inclination is changed from the first inclination to the second inclination.

10. A headlamp control method comprising:

receiving information regarding a distance from a speed breaker to a vehicle from a distance detection device included in the vehicle;

determining whether or not the distance from the speed breaker is less than a predetermined first threshold distance when the information regarding the distance from the speed breaker is received;

receiving information regarding an inclination from an inclination detection device included in the vehicle;

determining whether the inclination is a predetermined first inclination corresponding to an entry into the speed breaker or a predetermined second inclination corresponding to moving off of the speed breaker when the information regarding the inclination is received; and controlling a high-beam lamp or adjusting brightness of the high-beam lamp not to shine forward with respect to the vehicle, as a first state of the high-beam lamp, when the distance from the speed breaker is determined to be less than the first threshold distance, controlling a general-beam lamp or adjusting brightness of the general-beam lamp to shine forward and downward with respect to the vehicle, as a first state of the general-beam lamp, when the inclination is determined to be the first inclination, and controlling the high-beam lamp and the general-beam lamp to return to previous states of the high-beam and general-beam lamps when the inclination is determined to be changed from the first inclination to the second inclination, wherein the previous states of the high-beam and general-beam lamps respectively refer to a state of the high-beam lamp before the high-beam lamp is controlled or adjusted to the first current state of the high-beam lamp and to a state of the general-beam lamp before the general-beam lamp is controlled or adjusted to the first state of the general-beam lamp.

11. The headlamp control method of claim 10, further comprising:
receiving information regarding a speed from a speed detection device included in the vehicle;
calculating a movement distance using the speed; and
determining whether the movement distance is greater than the distance from the speed breaker,
wherein the controlling comprises controlling the high-beam lamp to return to the previous state of the high-beam when the inclination is determined to be not equal to the first inclination and also that the movement distance is greater than the distance from the speed breaker.

12. The headlamp control method of claim 10, wherein the controlling comprises decreasing the brightness of the high-beam lamp when the distance from the speed breaker is determined to be less than the first threshold distance and controlling the brightness of the high-beam lamp to return to the previous state of the high-beam when the inclination is determined to be changed from the first inclination to the second inclination.

13. The headlamp control method of claim 10, wherein the controlling comprises decreasing the brightness of the general-beam lamp when the inclination is determined to be the first inclination and controlling the brightness of the general-beam lamp to return to the previous state of the general-beam when the inclination is determined to be changed from the first inclination to the second inclination.

14. A headlamp control method comprising:
receiving information regarding a distance from a speed breaker from a distance detection device included in a vehicle;
determining whether or not the distance from the speed breaker is less than a predetermined first threshold distance;
receiving information regarding a speed from a speed detection device included in the vehicle;
calculating a movement distance using the speed;
determining whether the movement distance is greater than the distance from the speed breaker; and
controlling a high-beam lamp or controlling brightness of the high-beam lamp not to shine forward with respect to the vehicle, as a first state of the high-beam lamp, when the distance from the speed breaker is determined to be less than the first threshold distance, and controlling the high-beam lamp to return to a previous state of the high-beam when the movement distance is determined to be greater than the distance from the speed breaker,
wherein the previous state of the high-beam lamp refers to a state of the high-beam lamp before the high-beam lamp is controlled or adjusted to the first state of the high-beam lamp.

15. The headlamp control apparatus of claim 1, wherein the control unit is further configured to control the high-beam lamp to shine forward with respect to the vehicle when the first determined unit determines that the distance from the speed breaker is greater than or equal to the first threshold distance.

16. The headlamp control method of claim 10, wherein the controlling comprises controlling the high-beam lamp to shine forward with respect to the vehicle when the distance from the speed breaker is determined to be greater than or equal to the first threshold distance.

17. The headlamp control method of claim 14, wherein the controlling comprises controlling the high-beam lamp to shine forward with respect to the vehicle when the distance from the speed breaker is determined to be greater than or equal to the first threshold distance.

18. The headlamp control apparatus of claim 1, wherein the control unit turns off the high-beam lamp when the first determination unit determines that the distance from the speed breaker is less than the first threshold distance.

19. The headlamp control method of claim 10, wherein the controlling comprises turning off turns off the high-beam lamp when the distance from the speed breaker is determined to be less than the first threshold distance.

20. The headlamp control method of claim 14, wherein the controlling comprises turning off turns off the high-beam lamp when the distance from the speed breaker is determined to be less than the first threshold distance.

* * * * *